United States Patent [19]

Bradbury et al.

[11] Patent Number: 5,196,392

[45] Date of Patent: Mar. 23, 1993

[54] THERMAL TRANSFER PRINTING

[75] Inventors: Roy Bradbury, St. Helens; Ronald W. Kenyon, Manchester; Derek Thorp, Heywood, all of England

[73] Assignee: Imperial Chemical Industries PLC, London, England

[21] Appl. No.: 736,714

[22] Filed: Jul. 26, 1991

[30] Foreign Application Priority Data

Jul. 30, 1990 [GB] United Kingdom ............... 9016653

[51] Int. Cl.⁵ .................... B41M 5/035; B41M 5/38
[52] U.S. Cl. ................................. 503/227; 428/195; 428/913; 428/914
[58] Field of Search .................. 8/471; 428/195, 913, 428/914; 503/227

[56] References Cited

FOREIGN PATENT DOCUMENTS

| | | | |
|---|---|---|---|
| 033583 | 8/1981 | European Pat. Off. | 428/195 |
| 0109295 | 5/1984 | European Pat. Off. | 503/227 |
| 182507 | 5/1986 | European Pat. Off. | 428/195 |
| 216483 | 4/1987 | European Pat. Off. | 503/227 |
| 0279467 | 8/1988 | European Pat. Off. | 503/227 |
| 305886 | 3/1989 | European Pat. Off. | 428/195 |
| 2103231 | 2/1983 | United Kingdom | 428/195 |

*Primary Examiner*—Bruce H. Hess
*Attorney, Agent, or Firm*—Cushman, Darby & Cushman

[57] ABSTRACT

A thermal transfer printing sheet comprising a substrate having a coating of a polycyclic dye, selected from dioxodibenzofuran, dioxofuranindole and dioxobenzodipyrrole. The polycyclic dye carries pendant phenyl groups which themselves carry a variety of open-chain, cyclic and heterocyclic substituent groups.

3 Claims, No Drawings 14,196,392

THERMAL TRANSFER PRINTING

INTRODUCTION

This invention relates to dye diffusion thermal transfer printing (DDTTP), especially to a DDTTP transfer sheet carrying a dye and to the use of the transfer sheet in conjunction with a receiver sheet in a DDTTP process.

It is known to print woven or knitted textile material by a thermal transfer printing (TTP) process. In such a process a sublimable dye is applied to a paper substrate (usually as an ink also containing a resinous or polymeric binder to bind the dye to the substrate until it is required for printing) in the form of a pattern, to produce a transfer sheet comprising a paper substrate printed with a pattern which it is desired to transfer to the textile. Substantially all the dye is then transferred from the transfer sheet to the textile material, to form an identical pattern on the textile material, by placing the patterned side of the transfer sheet in contact with the textile material and heating the sandwich, under light pressure from a heated plate, to a temperature from 180°-220° C. for a period of 30-120 seconds.

As the surface of the textile substrate is fibrous and uneven it will not be in contact with the printed pattern on the transfer sheet over the whole of the pattern area. It is therefore necessary for the dye to be sublimable and vaporise during passage from the transfer sheet to the textile substrate in order for dye to be transferred from the transfer sheet to the textile substrate over the whole of the pattern area.

As heat is applied evenly over the whole area of the sandwich over a sufficiently long period for equilibrium to be established, conditions are substantially isothermal, the process is non-selective and the dye penetrates deeply into the fibres of the textile material.

In DDTTP, a transfer sheet is formed by applying a heat-transferable dye to a thin (usually <20 micron) substrate having a smooth plain surface (usually as an ink also containing a polymeric or resinous binder to bind the dye to the substrate) in the form of a continuous even film over the entire printing area of the transfer sheet. Dye is then selectively transferred from the transfer sheet by placing it in contact with a material having a smooth surface with an affinity for the dye, hereinafter called the receiver sheet, and selectively heating discrete areas of the reverse side of the transfer sheet for periods from about 1 to 20 milliseconds (msec) and temperatures up to 300° C., in accordance with a pattern information signal whereby dye from the selectively heated regions of the transfer sheet is transferred to the receiver sheet and forms a pattern thereon in accordance with the pattern in which heat is applied to the transfer sheet. The shape of the pattern is determined by the number and location of the discrete areas which are subjected to heating and the depth of shade in any discrete area is determined by the period of time for which it is heated and the temperature reached.

Heating is generally, though not necessarily, effected by a bank of pixels, over which the receiver and transfer sheet are passed together. Each pixel can be separately heated to 300° C. to 400° C., in less than 20 msec and preferably less than 10 msec, usually by an electric pulse in response to a pattern information signal. During the heating period the temperature of a pixel will rise from about 70° C. to 300°-400° C. over about 5-8 msec. With increase in temperature and time more dye will diffuse from the transfer to the receiver sheet and thus the amount of dye transferred onto, and the depth of shade at, any discrete area on the receiver sheet will depend on the period for which a pixel is heated while it is in contact with the reverse side of the transfer sheet.

As heat is applied through indiviually energised pixels for very short periods of time, conditions are adiabatic, the process is selective in terms of location and quantity of dye transferred and the transferred dye remains close to the surface of the receiver sheet.

It is clear that there are significant distinctions between TTP onto synthetic textile materials and DDTTP onto smooth polymeric surfaces and thus dyes which are suitable for the former process are not necessarily suitable for the latter.

In DDTTP it is important that the surfaces of the transfer sheet and receiver sheet are even so that good contact can be achieved between the printed surface of the transfer sheet and the receiving surface of the receiver sheet over the entire printing area because it is believed that the dye is transferred substantially by diffusion. Thus, any defect or speck of dust which prevents good contact over any part of the printing area will inhibit transfer and produce an unprinted portion on the receiver sheet which can be considerably larger than the area of the speck or defect. The receiving surfaces of the substrate of the transfer and receiver sheets are usually a smooth polymeric film, especially of a polyester, which has some affinity for the dye.

Important criteria in the selection of a dye for DDTTP are its thermal properties, brightness of shade, fastness properties, such as light fastness, and facility for application to the substrate in the preparation of the transfer sheet. For suitable performance the dye or dye mixture should transfer evenly and rapidly, in proportion to the heat applied to the transfer sheet so that the depth of shade on the receiver sheet is proportional to the heat applied and a true grey scale of coloration can be achieved on the receiver sheet. After transfer the dye should preferably not migrate or crystallise and have excellent fastness to light, heat, rubbing, especially rubbing with a oily or greasy object, e.g. a human finger, such as would be encountered in normal handling of of the printed receiver sheet. Full colour DDTTP is generally an additive trichromatic process and therefore brightness of shade is important in order to achieve as wide a range of colours from the three primary shades of yellow, magenta and cyan. However, it may be desirable to obtain certain other shades, such as navies and blacks, using single or pre-mixed dyes, rather than to develop these from the normal yellow, magenta and cyan trichromat. As the dye should be sufficiently mobile to migrate from the transfer sheet to the receiver sheet at the temperatures employed, 100°-400° C., in the short time-scale, generally <20 msec, it is preferably free from ionic and water-solubilising groups, and is thus not readily soluble in aqueous or water-miscible media, such as water and ethanol. Many potentially suitable dyes are also not readily soluble in the solvents which are commonly used in, and thus acceptable to, the printing industry; for example, alcohols such as i-propanol, ketones such as methyl ethyl ketone (MEK), methyl i-butyl ketone (MIBK) and cyclohexanone, ethers such as tetrahydrofuran and aromatic hydrocarbons such as toluene. The dye can be applied as a dispersion in a suitable medium or as a solution in a suitable solvent to the substrate from a solution. In order to achieve the potential for a deep shade on the receiver sheet it is desirable that the dye should be readily soluble or readily dispersable in the ink medium. It is also important that a dye which has been applied to a transfer sheet from a solution should be resistant to crystallisation so that it remains as an amorphous layer on the transfer sheet for a considerable time. Crystallisation not only produces defects which prevent good contact between the transfer receiver sheet but gives rise to uneven prints.

The following combination of properties is highly desirable for a dye which is to be used in DDTTP:
- Ideal spectral characteristics (narrow absorption curve with absorption maximum matching a photographic filter)
- High tinctorial strength.
- Correct thermochemical properties (high thermal stability and efficient transferability with heat).
- High optical densities on printing.
- Good solubility in solvents acceptable to printing industry: this is desirable to produce solution coated dyesheets alternatively good dispersion in acceptable media is desirable to produce dispersion coated dyesheets.
- Stable dyesheets (resistant to dye migration or crystallisation).
- Stable printed images on the receiver sheet (resistant to heat, migration, crystallisation, grease, rubbing and light).

The achievement of good light fastness in DDTTP is extremely difficult because of the unfavourable environment of the dye, close to the surface of the polyester receiver sheet. Many known dyes for polyester fibre with high light fastness (>6 on the International Scale of 1-8) on polyester fibre when applied by TTP when penetration into the fibres is good, exhibit very poor light fastness on a polyester receiver sheet when applied by DDTTP.

THE INVENTION

According to a first aspect of the present invention, there is provided a thermal transfer printing sheet comprising a substrate having a coating of a dye of Formula (1A):

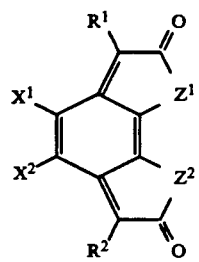

Formula (1A)

or a dye of Formula (1B):

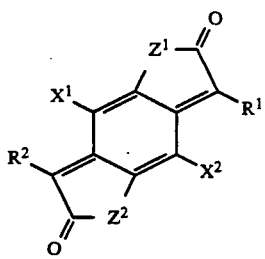

Formula (1B)

wherein:
$Z^1$ and $Z^2$ each independently represent oxygen or —NY in which Y is hydrogen, an optionally substituted hydrocarbon radical or an acyl radical;

$X^1$ and $X^2$ each independently represent H; halogen; cyano; alkyl; alkoxy; nitro; amino; substituted amino; carboxylic acid ester; optionally substituted carbamoyl; optionally substituted sulphamoyl; alkylthio; arylthio; alkylsulphonyl; arylsulphonyl; acyl; acyloxy; hydroxy; sulphonic acid; sulphonic acid ester; or in dyes of Formula (1A) $X^1$ and $X^2$ together form a 5- or 6-membered carbocyclic or heterocyclic, saturated or unsaturated, including aromatic, ring which may carry further substituents;

$R^1$ and $R^2$ each independently represent an unsubstituted aryl radical or an aryl radical substituted by at least one of the following: nitro, halogen, optically substituted alkyl, optionally substituted alkoxy, phenyl, alkenyl, alkoxyphenyl, phenoxy, cyano, carboxylic acid ester, optionally substituted carbamoyl, sulphonic acid, sulphonyl chloride, sulphonic acid ester, optionally substituted sulphamoyl, mercapto, optionally substituted alkylthio, arylthio, primary, secondary, tertiary or quaternary amino, acylamino, acyl, phosphonic acid, phosphonic acid ester, alkylsulphonyl, arylsulphonyl, aldehyde, acyloxy, and hydroxy;

A preferred class of compounds according to Formula (1B) are of Formula (2):

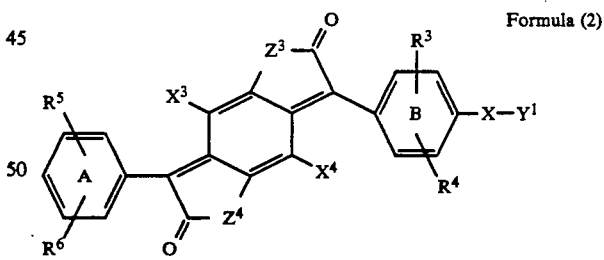

Formula (2)

$Z^3$ and $Z^4$ each independently represent oxygen or —NR$^7$ in which R$^7$ is H; $C_{1-8}$-alkyl or phenyl each of which is unsubstituted or substituted by groups selected from hydroxy, halogen, nitro and alkoxy; or $C_{1-4}$-alkyl- or phenyl-carbonyl or sulphonyl which may be substituted by one or more groups selected from hydroxy, halogen, nitro, $C_{1-4}$-alkyl and $C_{1-4}$-alkoxy;

$X^3$ and $X^4$ each independently represent H; halogen; cyano; $C_{1-4}$-alkyl, $C_{1-4}$-alkoxy or phenyl each of which is unsubstituted or substituted by groups selected from hydroxy, halogen, nitro, $C_{1-4}$-alkyl and $C_{1-4}$-alkoxy; carbamoyl or sulphamoyl of the formula —CONL$^1$L$^2$ or —SO$_2$NL$^1$L$^2$ wherein L$^1$ and L² are each independently hydrogen, C₁₋₄-alkyl or phenyl; and carboxylic acid ester of the formula —COOL³ wherein L³ is C₁₋₄-alkyl or phenyl;

R³ and R⁴ each independently represent H; C₁₋₄-alkyl; C₁₋₄-alkoxy; C₂₋₄-alkenyl or halogen;

R⁵ and R⁶ each independently represent H; C₁₋₄-alkyl; C₁₋₄-alkoxy; C₂₋₄-alkenyl, halogen or the group -X-Y¹; X is —O— or —S—; and Y¹ is hydrogen, a group of the formula:

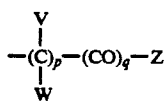

or a group of the formula:

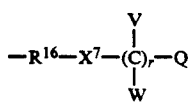

wherein:
V and W each independently represent H or C₁₋₄-alkyl;
p is an integer from 1 to 3;
q is 0 or 1;
p+q is at least 2; and
Z is OR⁸ or NR⁸R⁹ when q=1;
or Z is OR¹⁰ or SR¹⁰ when q=0;
R⁸ is selected from optionally substituted C₁₋₈-alkyl, optionally substituted C₁₋₈-alkoxy-C₁₋₈-alkyl;
R⁹ is selected from H, and optionally substituted C₁₋₈-alkyl;
R¹⁰ is selected from optionally substituted C₁₋₈-alkyl, optionally substituted C₁₋₈-alkoxy-C₁₋₈-alkyl, optionally substituted C₁₋₈-alkyl sulphonyl or carbonyl and optionally substituted phenyl sulphonyl or carbamoyl; the optional substituents for (i) the alkyl, alkoxyalkyl groups in R⁸, R⁹ and R¹⁰ being selected from C₁₋₄-alkoxy, halogen, cyano and hydroxy and (ii) the phenyl groups in R¹⁰ being selected from C₁₋₄-alkyl, C₁₋₄-alkoxy, halogen, cyano and hydroxy;
R¹⁶ is methylene or a straight or branched C₂₋₆-alkylene unsubstituted or substituted by a hydroxy group, C₁₋₄-alkoxy or C₁₋₄-carbonyloxy;
X⁷ is a direct linkage or is —O—, —S—, —SO—, —SO₂—, —CO—, —COO—,

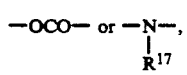

in which R¹⁷ is H or C₁₋₄-alkyl;
r is 0 or an integer from 1 to 3; and
Q is a 5-, 6- or 7-membered saturated or unsaturated heterocyclic group;
provided that the substituents on Rings A and B are different when Z³ and Z⁴ are the same or that Z³ and Z⁴ are different when the substituents on Rings A and B are the same.

A further preferred class of compounds according to Formula (1B) are:

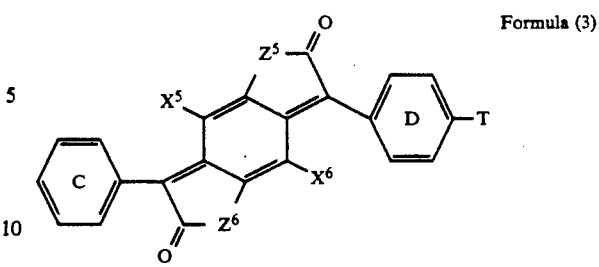

Formula (3)

Z⁵ and Z⁶ each independently represent oxygen or —NY² in which Y² is hydrogen, an optionally substituted hydrocarbon group or an acyl group:

X⁵ and X⁶ each independently represent H; halogen; cyano; alkyl; aryl; carbamoyl; sulphamoyl; or carboxylic acid ester;

T is —NR¹¹R¹² or —OR¹³;

R¹¹ & R¹² each independently represent H, or an optionally substituted alkyl, alkenyl, cycloalkyl, aralkyl or aryl group; or R¹¹ & R¹² together with the nitrogen atom to which they are attached form a heterocyclic ring; or R¹¹ or R¹² together with the nitrogen atom and the adjacent carbon atom of Ring D form a heterocyclic ring; and R¹³ is H or an optionally substituted alkyl, alkenyl, cycloalkyl or aralkyl group;

Ring C is unsubstituted or is substituted by from one to three groups;

Ring D is unsubstituted apart from the group T, or is substituted by one or two further groups, provided that the substituents on Rings C and D are different when Z⁵ and Z⁶ are the same or that Z⁵ and Z⁶ are different when the substituents on Rings C and D are the same.

The aryl radicals represented by R¹ and R² may be, for example, naphthyl radicals, but it is preferred that they are substituted or unsubstituted phenyl radicals.

It is further preferred that the alkyl and alkoxy radicals represented by X¹ and X² and which may be present as substituents on R¹ and R² are lower alkyl and lower alkoxy radicals respectively; also that the alkyl substituents of the alkylthio and alkylsulphonyl groups represented by X¹ and X² and which may be present as substituents on R¹ and R² are lower alkyl, that the aryl substituents of the arylthio and arylsulphonyl groups represented by X¹ and X² and which may be present as substituents on R¹ and R² are phenyl, and that the alkoxy substituent of the alkoxyphenyl groups which may be present as substituents on R¹ R² is lower alkoxy.

Throughout the specification the terms "lower alkyl" and "lower alkoxy" are used to denote alkyl and alkoxy groups respectively containing from 1 to 4 carbon atoms.

The optionally substituted carbamoyl groups represented by R¹, R², X¹ and X² are preferably of the formula:

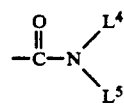

wherein L⁴ and L⁵ are each independently hydrogen, lower alkyl or phenyl. The carboxylic acid ester groups represented by $X^1$ and $X^2$ and which may be present as the substituents on $R^1$ and $R^2$ are preferably of the formula —$COOL^6$ wherein $L^6$ is an optionally substituted alkyl, in particular lower alkyl, or monocyclic aryl, in particular phenyl, radical.

The optionally substituted sulphamoyl groups which may be present as substituents on $R^1$ and $R^2$ are preferably of the formula:

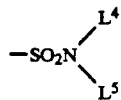

wherein $L^4$ and $L^5$ have the meanings defined above.

Examples of the optionally substituted hydrocarbon radicals represented by Y are alkyl and preferably lower alkyl such as methyl, ethyl, n-propyl and isopropyl, substituted alkyl and preferably substituted lower alkyl such as 2-hydroxyethyl, 2-methoxyethyl and 2-ethoxyethyl, phenyl and substituted phenyl such as tolyl, chlorophenyl, nitrophenyl and lower alkoxyphenyl.

Examples of the acyl radicals represented by Y are acetyl, chloracetyl, phenylacetyl, propionyl, butyryl, isobutyryl, methylsulphonyl, p-toluenesulphonyl, unsubstituted benzoyl and benzoyl substituted by halogen, nitro, lower alkyl, lower alkoxy or hydroxy.

Examples of acylamino groups which may be present as substituents on $R^1$ and $R^2$ are acetylamino, propionylamino, benzoylamino, methanesulphonylamino, benzenesulphonylamino, and toluenesulphonylamino.

Examples of the optionally substituted hydrocarbon groups represented by $R^7$ are alkyl and preferably $C_{1-4}$-alkyl, such as methyl, ethyl, n-propyl and iso-propyl; substituted alkyl, preferably substituted $C_{1-4}$-alkyl, such as beta-hydroxyethyl, beta-methoxyethyl and beta-ethoxyethyl; phenyl and substituted phenyl such as tolyl, chlorophenyl, nitrophenyl and $C_{1-4}$-alkoxyphenyl. Examples of the acyl groups represented by $R^7$ are acetyl, propionyl, n-butyryl, iso-butyryl, benzoyl and m-nitrobenzoyl, p-chlorobenzoyl, p-methylbenzoyl, p-methoxybenzoyl and p-hydroxybenzoyl.

In dyes of Formula (2), the unsaturated heterocyclic group represented by Q is selected from furyl, thienyl, pyrrolyl, pyridyl, pyranyl, thiazolyl, oxazolyl, pyrazolyl, imidazolyl, thiadiazolyl, s-triazinyl, benzofuranyl, benzothienyl, indolyl, benzoxazolyl, benzimidazolyl, benzothiazolyl, pyridothiazolyl, benzomorpholino and dithienyl.

The saturated heterocyclic group represented by Q is selected from tetrahydrofuryl, tetrahydrothienyl, pyrrolidyl, piperidyl, tetrahydropyranyl, morpholinyl, piperazinyl, hexahydroazepinyl and tetrahydro-1H-1,4-thiazine.

It is preferred that Q is tetrahydrofur-2-yl or tetrahydropyran-2-yl.

Benzene rings A and B are preferably different, the difference lying in the nature and/or the number of substituents carried by each ring. The difference lies preferably in the identity of the groups $R^3$ to $R^6$ and -$X$-$Y^1$ carried by these rings.

It is preferred that $R^5$ and $R^6$ are both H, $C_{1-4}$-alkyl or $C_{1-4}$-alkoxy or that one of $R^5$ and $R^6$ is $C_{1-4}$-alkyl, $C_{1-4}$-alkoxy or a group of the formula:

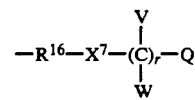

in which $R^{16}$, $X^7$, V, W, r and Q are as hereinbefore defined; and the other of $R^5$ and $R^6$ is H and that the substituent is present in a para position. It is preferred that $R^3$ and $R^4$ are both H, $C_{1-4}$-alkyl or $C_{1-4}$-alkoxy or that one is $C_{1-4}$-alkyl or $C_{1-4}$-alkoxy and the other is H and that any substituents are in ortho position with respect to the group —$X$—$Y^1$.

It is preferred that $X^3$ and $X^4$ are both hydrogen and it is also preferred that $Z^3$ and $Z^4$ are both oxygen. Under these preferred circumstances the asymmetry in the compound of Formula (2) is provided by a difference in substitution on benzene rings A and B. It is preferred that ring A is unsubstituted, or carries a single alkyl or alkoxy group in the para position, and that ring B carries a single substituent represented by —$X$—$Y^1$.

The alkyl groups forming the whole or part of $R^8$, $R^9$ and $R^{10}$ are preferably $C_{1-4}$-alkyl.

In one preferred group within Formula (2), q=1, p is 1 to 3 and Z is $OR^8$ and, in another preferred group within Formula (2), q=0, p=2 or 3 and Z is $OR^{10}$.

In a preferred group of compounds in which q=1, X is preferably —O— and p is preferably 1 or 2 and more preferably 1. It is also preferred that Z is $OR^8$ and that $R^8$ is preferably $C_{1-4}$-alkyl, $C_{1-4}$-alkoxy-$C_{1-4}$-alkyl or a second group represented by $Y1$ When $R^8$ is a second group represented by $Y^1$ it is preferred that X is —O—, V and W are H, p is 1 and Z is $C_{1-4}$-alkoxy or $C_{1-4}$-alkoxy-$C_{1-4}$-alkoxy. when Z is $NR^8R^9$ it is preferred that both $R^8$ and $R^9$ are $C_{1-4}$-alkyl.

In a preferred group of compounds in which q =0, X is preferably —O— and p is preferably 2. It is also preferred that Z is $OR^{10}$ and that $R^{10}$ is $C_{1-4}$-alkyl or $C_{1-4}$-alkoxy-$C_{1-4}$-alkyl.

In dyes according to Formula (2) in which q=1, $y^1$ may be a group of the formula:

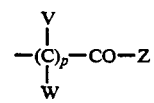

wherein:
Z is $OR^8$ or $NR^8R^9$;
V and W are each independently H or $C_{1-4}$-alkyl;
p is an integer from 1 to 3;
$R^8$ is selected from alkyl, $C_{1-4}$-alkoxy-$C_{1-4}$-alkyl, cyano-$C_{1-4}$-alkyl, $C_{1-4}$-alkoxy-$C_{1-4}$-alkoxy-$C_{1-4}$-alkyl, hydroxy-$C_{1-4}$-alkyl, halo-$C_{1-4}$-alkyl, and a group represented by $Y^1$ in which $R^8$=Y; and
$R^9$ is selected from H, $C_{1-4}$-alkyl and $C_{1-4}$-alkoxy-$C_{1-4}$-alkyl.

In this group of compounds it is preferred that X is —O— and further preferred that each of V and W are H and that p is 1 or 2 and more preferably 1. It is also preferred that Z is $OR^8$ in which $R^8$ is preferably $C_{1-4}$-alkyl, $C_{1-4}$-alkoxy-$C_{1-4}$-alkyl or a group represented by $y^1$ in which X is -O-, V and W are H, p is 1 and $R^8$ is $C_{1-4}$-alkyl or $C_{1-4}$-alkoxy-$C_{1-4}$-alkyl.

In dyes of Formula (3) the optionally substituted hydrocarbon group represented by $Y^2$ is preferably $C_{1-8}$-alkyl, and more preferably $C_{1-4}$-alkyl, or monocyclic aryl, more preferably phenyl. The acyl group represented by $Y^2$ is preferably $C_{1-4}$-alkyl- or monocyclic-aryl-carbonyl or -sulphonyl which may be substituted by one or more groups selected from hydroxy, halogen, nitro, $C_{1-4}$-alkyl and $C_{1-4}$-alkoxy. Examples of the optionally substituted hydrocarbon groups represented by $Y^2$ are alkyl and preferably $C_{1-4}$-alkyl, such as methyl, ethyl, n-propyl and iso-propyl; substituted alkyl, preferably substituted $C_{1-4}$-alkyl, such as beta-hydroxyethyl, beta-methoxyethyl and beta-ethoxyethyl; phenyl and substituted phenyl such as tolyl, chlorophenyl, nitrophenyl and $C_{1-4}$-alkoxyphenyl. Examples of the acyl groups represented by $Y^2$ are acetyl, propionyl, n-butyryl, iso-butyryl, benzoyl and nitrobenzoyl, chlorobenzoyl, methylbenzoyl, methoxybenzoyl and hydroxybenzoyl.

The aryl group represented by $X^5$ or $X^6$ is preferably mono-homocyclic aryl, that is phenyl and substituted phenyl. The $C_{1-4}$-alkyl and alkoxy groups represented by $X^5$ or $X^6$ may also be substituted and suitable substituents for these and the aryl group are hydroxy, halogen, nitro, $C_{1-4}$-alkyl and $C_{1-4}$-alkoxy. The halogen represented by $X^5$ or $X^6$ is preferably chlorine or bromine.

The carbamoyl and sulphamoyl groups represented by $X^5$ or $X^6$ are preferably of the formula —$CONL^7L^8$ or —$SO_2NL^8$ wherein $L^7$ and $L^8$ are each independently hydrogen, $C_{1-4}$-alkyl or monocyclic aryl, preferably phenyl. The carboxylic acid ester groups represented by $X^5$ and $X^6$ are preferably of the formula -$COOL^9$ wherein $L^9$ is optionally substituted alkyl, especially $C_{1-4}$-alkyl, or monocyclic aryl, especially phenyl, in which the substituents are as defined above.

When any of $R^{11}$ to $R^{13}$ is alkyl or alkenyl it preferably contains up to 20, more preferably up to 10 carbon atoms and especially up to 4, carbon atoms, with a preferred minimum of 3 carbon atoms for alkenyl groups); when cycloalkyl it is preferably $C_{4-8}$-cycloalkyl, such as cyclohexyl; and when aryl or aralkyl, the aryl is preferably monohomocyclic aryl, i.e. phenyl, and the aralkyl is preferably phenyl-$C_{1-4}$-alkylene, such as benzyl and phenylethyl. Where the groups represented by $R^{11}$ to $R^{13}$ are substituted, examples of preferred substituents are alkyl, alkoxy, nitro, halogen, alkoxyalkoxy, cyclohexyl, phenyl, diphenyl, hydroxy, alkylcarbonyl, alkoxycarbonyl, alkoxyalkoxycarbonyl, alkoxycarbonyloxy, alkoxyalkoxycarbonyloxy, alkylcarbonyloxy, cyano and amino in which each alkyl is preferably $C_{1-4}$-alkyl. Where the groups represented by $R^{11}$ and $R^{12}$, together with the nitrogen atom to which they are attached, form a heterocyclic group this is preferably alicyclic, such as piperidino or morpholino. Where a group represented by $R^{11}$ or $R^{12}$ together with the nitrogen atom to which it is attached and an adjacent carbon atom of Ring D or Ring C form a heterocyclic group fused to Ring D or Ring C respectively, this is preferably a 6-membered heteroaliphatic ring, i.e. $R^{11}$ or $R^{12}$ is trimethylene, and the combined fused rings preferably form a tetrahydroquinolyl group.

It is preferred that the dye of Formula (3) is "unsymmetrical" by virtue of differences in the definitions of $Z^5$ and $Z^6$, $X^5$ and $X^6$ and/or Ring C and Ring D. However, it is generally preferred that $Z^5$ and $Z^6$ are identical and $X^5$ and $X^6$ are identical and that the lack of symmetry arises from differences in Rings C and D. Where Ring C and Ring D are different, the difference preferably lies in the nature and/or the number of substituents carried by each ring. The difference lies preferably in the identity of the groups $R^{11}$ to $R^{13}$ but may lie in the identity and/or the number of the substituents carried by the rings. Examples of further substituents for Ring D, in addition to the group T, are alkyl; alkenyl; alkoxy; alkoxyalkoxy; alkoxycarbonylalkoxy; alkoxyalkoxycarbonylalkoxy; alkylcarbonyloxyalkoxy; cyanoalkyoxy, hydroxyalkoxy; halogen, especially chlorine or bromine; hydroxy; alkylthio; arylthio; aryloxy; alkylcarbonyl and alkylsulphonyl; and especially such groups in which the alkyl or alkenyl contains up to 4 carbon atoms and the aryl is phenyl. Examples of substituents for Ring C, in addition to those listed above for Ring D, are $NR^{11}R^{12}$, $OR^{13}$ and -NHacyl, especially $NHCOC_{1-4}$-alkyl and -$NHSO_2C_{1-4}$-alkyl.

It is preferred that $X^5$ and $X^6$ are both hydrogen and also preferred that $Z^5$ and $Z^6$ are both oxygen. When both these pairs of groups are identical, the preferred asymmetry in the compound of Formula (3) is provided by differences in Rings C and D. By this is meant that there is either a different number or different pattern of substituents on each ring.

A preferred sub-class of dyes according to Formula (1A), wherein substituents $X^1$ and $X^2$ are linked to form, with the carbon atoms to which they are attached, a 6-membered ring, conform to Formula (4):

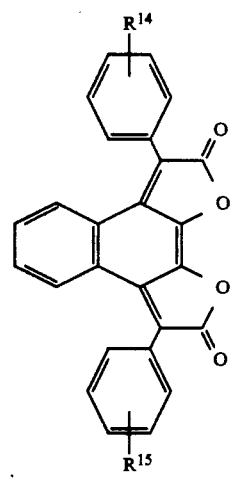

Formula (4)

wherein:

$R^{14}$ and $R^{15}$ each independently represent any of the groups hereinbefore described as suitable substituents in the groups $R^1$ and $R^2$.

Specific examples of suitable dyes of Formula (4) are Dye 1 in which $R^{14}$ and $R^{15}$ are hydrogen, Dye 26 in which $R^{14}$ is 4-$C_3H_7O$- and $R^{15}$ is 4-$C_3H_7OCOCH_2O$-, and Dye 27 in which $R^{14}$ is hydrogen and $R^{15}$ is 4—$C_3H_7OCOCH_2O$—.

It is preferred that the substituents $R^{14}$ and $R^{15}$ are in the 3- or 4-positions, especially in the 4-position of the phenyl rings to which they are attached.

A specific example of a suitable dye of Formula (2) is Dye 2 in which $Z^3$ and $Z^4$ are both oxygen, $X^3$, $X^4$, $R^3$, $R^5$ and $R^6$ are hydrogen, X is oxygen, $R^4$ is 3-methyl and $Y^1$ is 4-$OC_2H_4OCH_3$.

Specific examples of suitable dyes of Formula (3) are shown in Table 1.

TABLE 1

| Dye | Substituent in Ring C | Substituent in Ring D | T |
|---|---|---|---|
| 3 | 4-CH₃CH₂CH₂O | — | —OCH₂CO₂C₂H₄OC₂H₅ |
| 4 | — | 3-CH₃ | —NHC₂H₅ |
| 5 | 4-(CH₃)₂CHNH— | — | —N(C₂H₅)(CH₂Ph) |
| 6 | 4-(CH₃)₂CHCH₂CH(CH₃)NH | — | —N(C₂H₅)₂ |
| 7 | 4-piperidyl | — | —N(C₂H₄CO₂CH₃)₂ |
| 8 | 4-morpholino | — | —N(CH₃)(C₂H₅) |
| 9 | 4-morpholino | 3-CH₃ | —NHCH(CH₃)₂ |
| 10 | 4-(CH₃COOC₂H₄)₂N— | — | —N(C₂H₄CO₂CH₃)₂ |
| 11 | 4-(C₂H₅)₂N— | — | —NHCH(CH₃)₂ |
| 12 | 4-(C₂H₅)₂N | — | —N(C₂H₄CO₂CH₃)₂ |
| 13 | — | — | —OCH₂CO₂C₂H₄OC₂H₅ |
| 14 | — | — | —OCH₂CH₂CH₃ |
| 15 | — | — | —OCH₂CO₂C₂H₄OCH(CH₃)₂ |
| 16 | 4-CH₃CH₂CH₂O | — | —OCH₂CH₂CH(CH₃)₂ |
| 17 | 4-CH₃CH₂CH₂O | — | —OCH₂CH₂CH₃ |
| 18 | 4-CH₃CH₂CH₂O | — | —OCH(CH₃)₂ |
| 19 | 4-(CH₃)₂CHO | — | —OCH(CH₃)₂ |
| 20 | — | — | —OCH₂CO₂C₂H₄OCH₂CH(CH₃)₂ |
| 21 | — | — | —OCH₂CO₂CH(CH₃)₂ |

In Dyes 3-21, $Z^5$ and $Z^6$ are both oxygen and $X^5$ and $X^6$ are both hydrogen.

Specific examples of suitable dyes of Formula (2) are shown in Table 2.

TABLE 2

| Dye | $R^5$ | $Y^1$ |
|---|---|---|
| 22 | — | 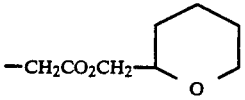 |
| 23 | CH₃CH₂CH₂O— | 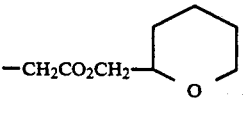 |
| 24 | — | 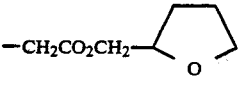 |
| 25 | CH₃CH₂CH₂CO— | 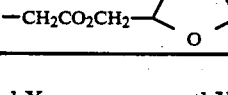 |

In Dyes 22-25, $Z^3$, $Z^4$ and X are oxygen and $X^3$, $X^4$, $R^3$, $R^4$, $R^6$ are hydrogen.

The dyes of of Formula (1A), Formula (1B), Formula (2) and Formula (3) have high heat fastness in textile applications and have relatively high molecular weights. Dyes with such properties are not usually considered suitable for thermal transfer printing (DDTTP) and it is therefore surprising that the defined benzodifuranone (BDF) dyes give prints with acceptable optical densities. The BDF dyes also give prints with good storage stability and grease resistance.

PREPARATION OF THE DYES

The dyes of Formula (1A), Formula (1B), Formula (2) and Formula (3) may be prepared using the process described in EP 0023080B, EP 0146269B and EP 0363034A.

THE COATING

The coating suitably comprises a binder together with a dye of Formula (1A) or Formula (1B) or Formula (2) or Formula (3). The ratio of binder to dye is preferably at least 1:1 and more preferably from 1.5:1 to 4:1 in order to provide good adhesion between the dye and the substrate and inhibit migration of the dye during storage.

The coating may also contain other additives, such as curing agents, preservatives, etc., these and other ingredients being described more fully in EP 133011A, EP 133012A and EP 111004A.

THE BINDER

The binder may be any resinous or polymeric material suitable for binding the dye to the substrate which has acceptable solubility in the ink medium, i.e. the medium in which the dye and binder are applied to the transfer sheet. It is preferred however, that the dye is soluble in the binder so that it can exist as a solid solution in the binder on the transfer sheet. In this form it is generally more resistant to migration and crystallisation during storage. Examples of binders include cellulose derivatives, such as ethylhydroxyethylcellulose (EHEC), hydroxypropylcellulose (HPC), ethylcellulose, methylcellulose, cellulose acetate and cellulose acetate butyrate; carbohydrate derivatives, such as starch; alginic acid derivatives; alkyd resins; vinyl resins and derivatives, such as polyvinyl alcohol, polyvinyl acetate, polyvinyl butyral and polyvinyl pyrrolidone; polymers and co-polymers derived from acrylates and acrylate derivatives, such as polyacrylic acid, polymethyl methacrylate and styrene-acrylate copolymers, polyester resins, polyamide resins, such as melamines; polyurea and polyurethane resins; organosilicones, such as polysiloxanes, epoxy resins and natural resins, such as gum tragacanth and gum arabic. Mixtures of two or more of the above resins may also be used. It is also preferred to use a binder which is soluble in one of the above-mentioned commercially acceptable organic solvents. Preferred binders of this type are EHEC, particularly the low and extra-low viscosity grades, and ethyl cellulose.

The dyes of Formula (1A), Formula (1B), Formula (2) and Formula (3) have particularly good thermal properties giving rise to even prints on the receiver sheet, whose depth of shade is accurately proportional to the quantity of applied heat so that a true grey scale of coloration can be attained.

The dyes of Formula (1A), Formula (1B), Formula (2) and Formula (3) also have strong coloristic properties and good solubility in a wide range of solvents, especially those solvents which are widely used and accepted in the printing industry, for example, alkanols, such as i-propanol and butanol; aromatic hydrocarbons, such as toluene, and ketones such as MEK, MIBK and cyclohexanone. Alternatively the dye may be dispersed by high shear mixing in suitable media such as water, in the presence of dispersing agents. This produces inks (solvent plus dye and binder) which are stable and allow production of solution or dispersion coated dyesheets. The latter are stable, being resistant to dye crystallisation or migration during prolonged storage.

The combination of strong coloristic properties and good solubility in the preferred solvents allows the achievement of deep, even shades on the receiver sheet. The receiver sheets according to the present invention have bright, strong and even red, orange, yellow, blue, cyan and magenta shades which are fast to both light and heat and to the effects of finger grease.

THE SUBSTRATE

The substrate may be any sheet material preferably having at least one smooth even surface and capable of withstanding the temperatures involved in DDTTP, i.e. up to 400° C. for periods up to 20 msec, yet thin enough to transmit heat applied on one side through to the dyes on the other side to effect transfer of the dye onto a receiver sheet within such short periods. Examples of suitable materials are polymers, especially polyester, polyacrylate, polyamide, cellulosic and polyalkylene films, metallised forms thereof, including co-polymer and laminated films, especially laminates incorporating a smooth even polyester receptor layer on which the dye is deposited. Thin (<20 micron) high quality paper of even thickness and having a smooth coated surface, such as capacitor paper, is also suitable. A laminated substrate preferably comprises a backcoat, on the opposite side of the laminate from the receptor layer, of a heat resistant material, such as a thermosetting resin, e.g a silicone, acrylate or polyurethane resin, to separate the heat source from the polyester and prevent melting of the latter during the DDTTP operation. The thickness of the substrate depends to some extent upon its thermal conductivity but it is preferably less than 20 um and more preferably less than 10 um.

THE DDTTP PROCESS

According to a further feature of the present invention there is provided a dye diffusion thermal transfer printing process which comprises contacting a transfer sheet comprising a coating comprising a dye of Formula (1A), Formula (1B), Formula (2) or Formula (3) with a receiver sheet, so that the coating is in contact with the receiver sheet and selectively applying heat to discrete areas on the reverse side of the transfer sheet whereby the dye on the opposite side of the sheet to the heated areas is transferred to the receiver sheet.

Heating in the selected areas can be effected by contact with heating elements (pixels), which can be heated to 200°–450° C., preferably 200°–400° C., over periods of 2 to 10 msec, whereby the dye mixture may be heated to 150°–300° C., depending on the time of exposure, and thereby caused to transfer, substantially by diffusion, from the transfer to the receiver sheet. Good contact between coating and receiver sheet at the point of application is essential to effect transfer. The density of the printed image is related to the time period for which the transfer sheet is heated.

THE RECEIVER SHEET

The receiver sheet conveniently comprises a polyester sheet material, especially a white polyester film, preferably of polyethylene terephthalate (PET). Although some dyes of Formula (1A), Formula (1B), Formula (2) and Formula (3) are known for the coloration of textile materials made from PET, the coloration of textile materials, by dyeing or printing is carried out under such conditions of time and temperature that the dye can penetrate into the PET and become fixed therein. In thermal transfer printing, the time period is so short that penetration of the PET is much less effective and the substrate is preferably provided with a receptive layer, on the side to which the dye is applied, into which the dye mixture more readily diffuses to form a stable image. Such a receptive layer, which may be applied by co-extrusion or solution coating techniques, may comprise a thin layer of a modified polyester or a different polymeric material which is more permeable to the dye than the PET substrate. While the nature of the receptive layer will affect to some extent the depth of shade and quality of the print obtained it has been found that the dyes of Formula (1A), Formula (1B), Formula (2) and Formula (3) give particularly strong and good quality prints (e.9. fast to light, heat and storage) on any specific transfer or receiver sheet, compared with other dyes of similar structure which have been proposed for thermal transfer printing processes. The design of receiver and transfer sheets is discussed further in EP 133,011 and EP 133012.

The invention is further illustrated by the following examples in which all parts and percentages are by weight.

INK 1

This was prepared by dissolving 0.1 parts of Dye 1 in 5 parts of chloroform and adding 9.5 parts of a 2.7% solution of EHEC in chloroform. This ink was stirred until homogeneous.

INKS 2-27

These were prepared by the same method as Ink 1 except that Dye 1 was replaced by Dyes 2-27 respectively.

TRANSFER SHEET TS1

This was prepared by applying Ink 1 to a 6 um polyethylene terephthalate sheet (substrate) using a wire-wound metal Meyer-bar (K-bar No 3) to produce a wet film of ink on the surface of the sheet. The ink was then dried with hot air to give a 3 um dry film on the surface of the substrate.

TRANSFER SHEETS TS2-TS27

These were prepared in the same manner as TS1 using each of Inks 2-27 in place of Ink 1.

PRINTED RECEIVER SHEET RS1

A sample of TS 1 was contacted with a receiver sheet, comprising a composite structure based in a white polyester base having a receptive coating layer on the side in contact with the printed surface of TS 1. The receiver and transfer sheets were placed together on the drum of a transfer printing machine and passed over a matrix of closely-spaced pixels which were selectively heated in accordance with a pattern information signal to a temperature of >300° C. for periods from 2 to 10 msec, whereby a quantity of the dye, in proportion to the heating period, at the position on the transfer sheet in contact with a pixel while it was hot was transferred from the transfer sheet to the receiver sheet. After passage over the array of pixels the transfer sheet was separated from the receiver sheet.

PRINTED RECEIVER SHEETS RS2 To RS27

These were prepared in the same way as RS1 using TS2 to TS27 in place of TS1.

EVALUATION OF INKS, TRANSFER SHEETS AND PRINTED RECEIVER SHEETS

The stability of the ink and the quality of the print on the transfer sheet was assessed by visual inspection. An ink was considered to be stable if there was no precipitation over a period of two weeks at ambient and a transfer sheet was considered to be stable if it remained substantially free from crystallisation for a similar period.

The quality of the printed impression on the receiver sheet was assessed in respect of colour density by means of a densitometer (Sakura Digital densitometer). The results of the assessments are shown in Table 3:

TABLE 3

| Receiver Sheet | Optical Density |
| --- | --- |
| 1 | 1.14 |
| 2 | 1.27 |
| 3 | 1.37 |
| 4 | 1.69 |
| 5 | 1.19 |
| 6 | 1.09 |
| 7 | 0.78 |
| 8 | 1.2 |
| 9 | 1.14 |
| 10 | 0.62 |
| 11 | 1.23 |
| 12 | 0.78 |
| 13 | 0.65 |
| 14 | 0.86 |
| 15 | 1.12 |
| 16 | 0.5 |
| 17 | 0.55 |
| 18 | 0.7 |
| 19 | 1.17 |
| 20 | 1.18 |
| 21 | 1.08 |
| 22 | 1.09 |
| 23 | 1.53 |
| 24 | 1.07 |
| 25 | 1.52 |
| 26 | 0.65 |
| 27 | 0.86 |

We claim:

1. A thermal transfer printing sheet comprising a substrate having a coating of a dye of Formula (1A):

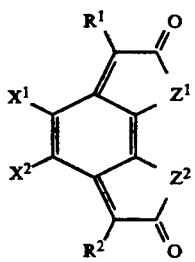

Formula (1A)

or a dye of Formula (1B):

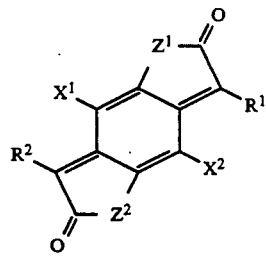

Formula (1B)

wherein:
$Z^1$ and $Z^2$ each independently represent oxygen or —NY in which Y is hydrogen, an optionally substituted hydrocarbon radical or an acyl radical;
$X^1$ and $X^2$ each independently represent H; halogen; cyano; alkyl; alkoxy; nitro; amino; substituted amino; carboxylic acid ester; optionally substituted carbamoyl; optionally substituted sulphamoyl; alkylthio; arylthio; alkylsulphonyl; arylsulphonyl; acyl; acyloxy; hydroxy; sulphonic acid; sulphonic acid ester; or in dyes of Formula (1A) $X^1$ and $X^2$ together form a 5- or 6-membered carbocyclic or heterocyclic, saturated or unsaturated ring which may carry further substituents;
$R^1$ and $R^2$ each independently represent an unsubstituted aryl radical or an aryl radical substituted by at least one of the following: nitro, halogen, optically substituted alkyl, optionally substituted alkoxy, phenyl, alkenyl, alkoxyphenyl, phenoxy, cyano, carboxylic acid ester, optionally substituted carbamoyl, sulphonic acid, sulphonyl chloride, sulphonic acid ester, optionally substituted sulphamoyl, mercapto, optionally substituted alkylthio, arylthio, primary, secondary, tertiary or quaternary amino, acylamino, acyl, phosphonic acid, phosphonic acid ester, alkylsulphonyl, arylsulphonyl, aldehyde, acyloxy, and hydroxy.

2. A thermal transfer printing sheet comprising a substrate having a coating of a dye of Formula (2):

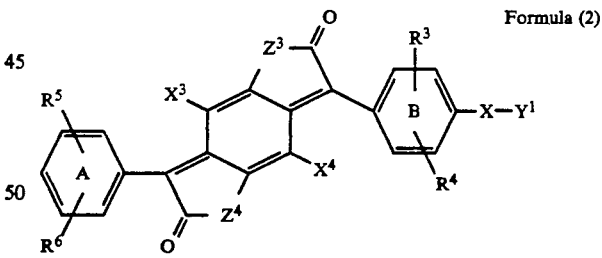

Formula (2)

$Z^3$ and $Z^4$ each independently represent oxygen, or —$NR^7$ in which $R^7$ is H; $C_{1-8}$-alkyl or phenyl each of which is unsubstituted or substituted by groups selected from hydroxy, halogen, nitro and alkoxy; or $C_{1-4}$-alkyl- or phenyl-carbonyl or sulphonyl which may be substituted by one or more groups selected from hydroxy, halogen, nitro, $C_{1-4}$-alkyl and $C_{1-4}$-alkoxy;

$X^3$ and $X^4$ each independently represent H; halogen; cyano; $C_{1-4}$-alkyl, $C_{1-4}$-alkoxy or phenyl each of which is unsubstituted or substituted by groups selected from hydroxy, halogen, nitro, $C_{1-4}$-alkyl and $C_{1-4}$-alkoxy; carbamoyl or sulphamoyl of the formula -$CONL^1L^2$ or -$SO_2NL^1L^2$ wherein $L^1$ and $L^2$ are each independently hydrogen, $C_{1-4}$-alkyl or phenyl; and carboxylic acid ester of the formula -COOL³ wherein L³ is C₁₋₄-alkyl or phenyl;

R³ and R⁴ each independently represent H; C₁₋₄-alkyl; C₁₋₄-alkoxy; C₂₋₄-alkenyl or halogen;

R⁵ and R⁶ each independently represent H; C₁₋₄-alkyl; C₁₋₄-alkoxy; C₂₋₄-alkenyl, halogen or the group -X-Y¹;

X is —O— or —S—; and

Y¹ is hydrogen, a group of the formula:

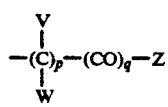

or a group of the formula:

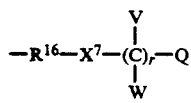

V and W each independently represent H or C₁₋₄-alkyl;

p is an integer from 1 to 3;

q is 0 or 1;

p+q is at least 2; and

Z is OR⁸ or NR⁸R⁹ when q=1;

or Z is OR¹⁰ or SR¹⁰ when q=0;

R⁸ is selected from optionally substituted C₁₋₈-alkyl, optionally substituted C₁₋₈-alkoxy-C₁₋₈-alkyl;

R⁹ is selected from H, and optionally substituted C₁₋₈-alkyl;

R¹⁰ is selected from optionally substituted C₁₋₈-alkyl, optionally substituted C₁₋₈-alkoxy-C₁₋₈-alkyl, optionally substituted C₁₋₈-alkyl sulphonyl or carbonyl and optionally substituted phenyl sulphonyl or carbamoyl; the optional substituents for (i) the alkyl, alkoxyalkyl groups in R⁸, R⁹ and R¹⁰ being selected from C₁₋₄-alkoxy, halogen, cyano and hydroxy and (ii) the phenyl groups in R¹⁰ being selected from C₁₋₄-alkyl, C₁₋₄-alkoxy, halogen, cyano and hydroxy;

R¹⁶ is methylene or straight or branched C₂₋₆-alkylene unsubstituted or substituted by a hydroxy group, C₁₋₄-alkoxy or C₁₋₄-carbonyloxy;

X⁷ is a direct linkage or is -O-, -S-, -SO-, -SO₂-, -CO-, -COO-,

—OCO— or —N—,
|
R¹⁷ in which R¹⁷ is H or C₁₋₄-alkyl;

r is 0 or an integer from 1 to 3; and

Q is a 5-, 6- or 7-membered saturated or unsaturated heterocyclic group;

provided that the substituents on Rings A and B are different when Z³ and Z⁴ are the same or that Z³ and Z⁴ are different when the substituents on Rings A and B are the same.

3. A thermal transfer printing sheet comprising a substrate having a dye of Formula (3):

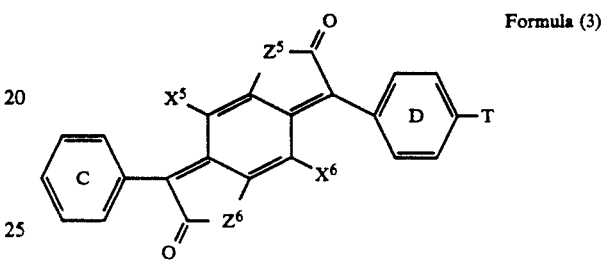

Formula (3)

wherein:

Z⁵ and Z⁶ each independently represent oxygen, or —NY² in which Y² is hydrogen, an optionally substituted hydrocarbon group or an acyl group;

X⁵ and X⁶ each independently represent H; halogen; cyano; alkyl; aryl; carbamoyl; sulphamoyl; or carboxylic acid ester; T is -NR¹¹R¹² or -OR¹³;

R¹¹ & R¹² each independently represent H, or an optionally substituted alkyl, alkenyl, cycloalkyl, aralkyl or aryl group; or R¹¹ & R¹² together with the nitrogen atom to which they are attached form a heterocyclic ring; or R¹¹ or R¹² together with the nitrogen atom and the adjacent carbon atom of Ring D form a heterocyclic ring; and R¹³ is H or an optionally substituted alkyl, alkenyl, cycloalkyl or aralkyl group;

Ring C is unsubstituted or is substituted by from one to three groups;

Ring D is unsubstituted apart from the group T, or is substituted by one or two further groups;

provided that the substituents on Rings C and D are different when Z⁵ and Z⁶ are the same or that Z⁵ and Z⁶ are different when the substituents on Rings C and D are the same.

* * * * *